US011316441B2

(12) United States Patent
Shah

(10) Patent No.: US 11,316,441 B2
(45) Date of Patent: Apr. 26, 2022

(54) CONTROLLED GATE-SOURCE VOLTAGE N-CHANNEL FIELD EFFECT TRANSISTOR (NFET) GATE DRIVER

(71) Applicant: Cypress Semiconductor Corporation, San Jose, CA (US)

(72) Inventor: Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/987,023

(22) Filed: Aug. 6, 2020

(65) Prior Publication Data

US 2021/0058005 A1 Feb. 25, 2021

Related U.S. Application Data

(63) Continuation of application No. 16/572,210, filed on Sep. 16, 2019, now Pat. No. 10,756,644.

(60) Provisional application No. 62/890,400, filed on Aug. 22, 2019.

(51) Int. Cl.
*H02M 7/217* (2006.01)
*H02M 3/07* (2006.01)
*H02M 3/335* (2006.01)
*H02J 7/00* (2006.01)

(52) U.S. Cl.
CPC ............ *H02M 7/217* (2013.01); *H02M 3/07* (2013.01); *H02M 3/33592* (2013.01); *G06F 2213/0042* (2013.01); *H02J 7/00034* (2020.01); *H02J 2207/20* (2020.01); *H02M 3/33576* (2013.01)

(58) Field of Classification Search
CPC .... H02M 7/217; H02M 3/33592; H02M 3/07; H02M 3/33576; H02M 1/08; H02M 3/33523; H02M 3/33507; H02J 7/00034; H02J 2207/20; H02J 2310/22; H02J 7/02; G06F 2213/0042; Y02B 40/00
See application file for complete search history.

(56) References Cited

U.S. PATENT DOCUMENTS

| 6,000,042 A | 12/1999 | Henrie |
| 6,731,164 B2 | 5/2004 | Johnston |
| 8,138,806 B2 | 3/2012 | Wadekar et al. |
| 8,385,036 B2 | 2/2013 | Koch |
| 9,018,924 B2 | 4/2015 | Vemula |
| 9,088,158 B2 | 7/2015 | Maggio et al. |
| 9,190,867 B2 | 11/2015 | Shimizu |
| 9,218,043 B2 | 12/2015 | Wei et al. |
| 10,038,427 B2 | 7/2018 | Ahn et al. |
| 10,218,129 B1 | 2/2019 | Mondal et al. |
| 10,651,754 B1 * | 5/2020 | Murugesan ....... H02M 3/33523 |

(Continued)

OTHER PUBLICATIONS

"TPS65983B USB Type-C and USB PD Controller, Power Switch, and High Speed Multiplexer", Texas Instruments, Oct. 2016, Revised Jun. 2018, 120 pages.

(Continued)

*Primary Examiner* — Kyle J Moody

(57) ABSTRACT

Controlling gate-source voltage with a gate driver in a secondary-side integrated circuit (IC) controller for a secondary-controlled AC-DC converter is described. In an example embodiment, the gate driver is configured to programmably control the gate-source voltage and the slew rate of a secondary-side provider field effect transistor (FET) in the converter.

20 Claims, 8 Drawing Sheets

(56) References Cited

U.S. PATENT DOCUMENTS

| | | | |
|---|---|---|---|
| 10,756,644 B1* | 8/2020 | Shah | H02J 7/02 |
| 10,951,107 B2* | 3/2021 | Khamesra | H02M 1/32 |
| 2009/0268494 A1* | 10/2009 | Hu | H02M 1/08 |
| | | | 363/89 |
| 2011/0115541 A1 | 5/2011 | Barrow | |
| 2013/0300343 A1 | 11/2013 | Files et al. | |
| 2016/0087541 A1 | 3/2016 | Xie et al. | |
| 2016/0149504 A1* | 5/2016 | Quigley | H02M 3/33546 |
| | | | 363/21.04 |
| 2017/0317583 A1 | 11/2017 | Forghani-zadeh et al. | |
| 2018/0351462 A1* | 12/2018 | Li | H02M 3/33592 |
| 2019/0089258 A1 | 3/2019 | Giuliano et al. | |
| 2019/0140631 A1 | 5/2019 | Manohar et al. | |
| 2019/0288532 A1 | 9/2019 | Mattos et al. | |
| 2020/0112265 A1* | 4/2020 | Hara | H02M 1/08 |
| 2021/0091675 A1* | 3/2021 | Rajesh | H02M 1/0029 |

OTHER PUBLICATIONS

International Search Report for International Application No. PCT/US2020/043727 dated Aug. 31, 2020; 2 pages.
USB Power Delivery Controller for AC/DC Power Adapters, iW656, dialog Semiconductor, Product Summary, Jan. 9, 2018, Rev 1.0, 8 pages.
USPTO Ex Parte Quayle Action for U.S. Appl. No. 16/572,210 dated Jan. 31, 2020; 6 pages.
USPTO Notice of Allowance for U.S. Appl. No. 16/572,210 dated Apr. 23, 2020; 8 pages.
Written Opinion of the International Searching Authority for International Application No. PCT/US2020/043727 dated Aug. 31, 2020; 3 pages.

* cited by examiner

CONTROLLED GATE-SOURCE VOLTAGE N-CHANNEL FIELD EFFECT TRANSISTOR (NFET) GATE DRIVER

RELATED APPLICATIONS

This application is a Continuation Application of U.S. patent application Ser. No. 16/572,210, filed on Sep. 16, 2019, which claims the benefit of U.S. Provisional Application No. 62/890,400, filed Aug. 22, 2019, both of which are incorporated by reference herein in their entirety.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
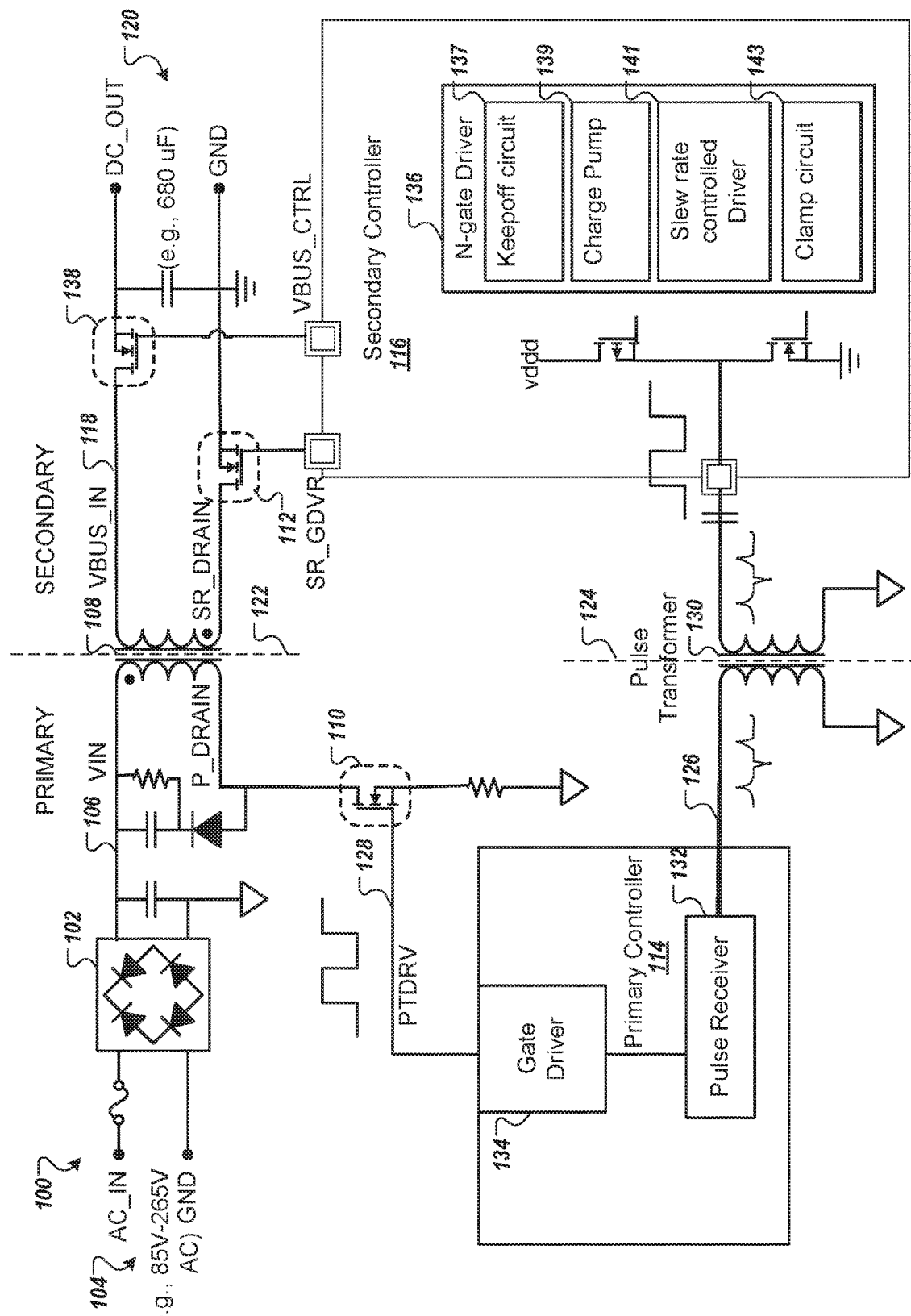
FIG. 1 is a block diagram of a secondary-controlled flyback converter with a gate driver with a programmable gate-source clamp voltage and programmable slew rate control according to one embodiment.

The following description sets forth numerous specific details such as examples of specific systems, components, methods, and so forth, in order to provide a good understanding of various embodiments of the techniques described herein for controlling a gate-source voltage of an N-channel field effect transistor (NFET) gate using a programmable NFET gate driver integrated on a secondary controller in a secondary-controlled flyback converter, such as used in USB power delivery applications. In other embodiment, the gate-source voltage of a P-channel FET (PFET) gate can be controlled using a PFET gate driver integrated on the secondary controller. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples" are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for controlling a gate-source voltage of an NFET (e.g., a provider FET) gate using a programmable NFET gate driver (e.g., a secondary gate driver) integrated on a secondary-side controller in a secondary-controlled flyback converter coupled to power lines in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC USB Type-C power adapters with a provider FET (e.g., a pass gate FET, an NFET switch), alternating current to direct current (AC-DC) power adapters, Type-C/PD products using a provider FET for a provider or consumer path, power-adapter solutions along with Type-C PD capability, and USB Type-C compliant DC-DC power providers and/or suppliers with provider FET. These embodiments can improve reliability while having fewer board components, reducing the overall cost of the system by reducing the overall bill of material (BOM) and further reducing the controller board size. A feature-rich USB-C NFET gate driver with programmable slew rate control may enable a customer to enhance their system design.

A USB-enabled electronic device or a system may comply with at least one release of the USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

With a secondary-controlled flyback converter, also referred to as a secondary-based power adapter, a USB-C/PD VBUS supply is used to deliver power with a wide voltage supply range of 3.3V-21.5V. As required by the USB-C protocol, in such a power adapter, a provider FET (e.g., a switch, a pass gate FET) is used on the VBUS supply line, such that when the provider FET is switched on, power is delivered from the power provider to a consumer. For example, a provider FET with a 10V-12V maximum gate-source voltage may be used and switched with a gate driver. To drive a provider FET, a three-stage charge-pump with a supply range of 3.3V-5.5V per stage may be used in order to drive the NFET gate voltage between 9V-16.5V. However, such a gate driver cannot be used to control the gate-source voltage of the provider FET and therefore can only be used with limited FET choices which can support a maximum gate voltage of 20V under normal operating conditions. Due to the maximum supply voltage of 21.5V and the maximum gate voltage of 16.5V, the maximum voltage supplied by the gate driver can be 38V, which can trigger an internal electrostatic discharge (ESD) device (which may be triggered at 34V) and may cause damage to the provider FET. Some gate drivers do not have a way to control the rate of charge flow (e.g., the slew rate), which may allow a large current to flow through the provider FET, which may also result in damage to the provider FET.

Described herein are various embodiments of techniques for controlling provider FET with a feature-rich gate driver integrated on the secondary-side controller in a secondary-controlled flyback converter. The embodiments described herein may address the above-mentioned and other challenges by driving the provider FET with a gate driver integrated on the secondary-side controller (e.g., a secondary gate driver) without the additional logic and circuits and complicated protocols described above. In some cases, the embodiments can provide information that is stored in the secondary-side controller. The embodiments described herein can provide a firmware-based optimization of flyback converter without additional circuitry outside of the secondary-side controller. The embodiments described herein can provide firmware-based modifications related to a specific board design. The embodiments described herein can provide enhanced system designs for improved reliability. The embodiments described herein can reduce the bill of materials on the primary-side of the flyback converter, such as by reducing external resistance required for constant current or external cap required for soft-start ramp and the like. The embodiments described herein can save on cost and board space. In some embodiments, other converters may be used instead of the flyback transformer, e.g., a switching converter, or the like.

The embodiments described herein may address the above-mentioned and other challenges by providing, a serial bus-compatible power supply device, such as a serial bus power delivery (SBPD) device with a power control analog subsystem having hardware, firmware, or any combination for a gate driver with a programmable gate-source clamp voltage and a programmable slew-rate control, integrated on a secondary-side controller in order to control a gate-source voltage of an NFET (also referred to as a "provider FET" or a "provider NFET" herein). The NFET can be an external NFET. The SBPD (also referred to as a "source device" herein) may be a USB compatible power supply device. The embodiments described herein can also be implemented in other types of power adapters, power converters, power delivery circuits, or the like.

FIG. 1 is a block diagram of a secondary-controlled flyback converter 100 with a gate driver with a programmable gate-source clamp voltage and programmable slew rate control according to one embodiment. The secondary-controlled flyback converter 100 can be part of an AC-DC power adapter device. The secondary-controlled flyback converter 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side power switch 110 (e.g., a primary-side FET, a power FET, or a primary FET), a secondary-side power switch 112 (e.g., secondary-side FET 112, power FET, or secondary FET), a primary-side controller 114, and a secondary-side controller 116. The secondary-side controller 116 includes a secondary gate driver with a programmable gate-source clamp voltage and programmable slew rate control as described in more detail below. The rectified DC line 106 is coupled to a first end of a primary winding of the flyback transformer 108. VIN is the voltage on the rectified DC line 106 after the rectifier 102. A second end of the primary winding is coupled to a primary drain of the primary-side FET 110. A first end of the secondary winding of the flyback transformer 108 is coupled to a direct current (DC) output line 118 (VBUS_IN) and a drain of the provider FET. A second end of the secondary winding is coupled to a secondary drain of the secondary-side FET 112 (SR_Drain). VBUS is the voltage on the DC output of the flyback transformer 108. SR_Drain is the drain node of the secondary-side FET 112. The DC output line 118 and the secondary-side FET 112 are coupled to DC output terminals 120.

The secondary-controlled flyback converter 100 is used for AC-DC conversion with galvanic isolation between the inputs and any outputs. The secondary-controlled flyback converter 100 uses an inductor split with the flyback transformer 108 with a galvanic isolation barrier 122 between a primary side and a secondary side. When the primary-side power switch 110 (the primary-side FET) is closed, the primary side of the flyback transformer 108 is connected to the input voltage source. In this embodiment, the primary side of the flyback transformer 108 is coupled to the rectifier 102. As the primary current and magnetic flux in the flyback transformer 108 increases, energy is stored in the transformer core of the flyback transformer 108. The voltage induced in the secondary winding is negative and blocked. When the primary-side power switch 110 (the primary-side FET) is opened, the primary current and magnetic flux drop. The secondary voltage is positive, allowing current to flow from the flyback transformer 108. The energy from the transformer core supplies an output load. An output capacitor can be used to charge and supply energy to the output load. Thus, the flyback transformer 108, based on control of the primary-side power switch 110 can store energy and transfer the energy to the output of the secondary-controlled flyback converter 100. It should also be noted that the secondary-controlled flyback converter 100 can include other components in the input stage, in the output stage, or in both. For example, a bulk capacitor can be coupled between the output of the rectifier 102 and a ground node. During operation, the AC input power is rectified and filtered by the rectifier 102 (bridge rectifier) and the bulk capacitor. This creates a DC high voltage bus which is connected to the primary winding of the flyback transformer 108. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage.

The secondary-controlled flyback converter 100 operates as an isolated power converter. The two prevailing control schemes are voltage mode control and current mode control. Both control schemes use a signal related to the output voltage. An opto-coupler or a pulse transformer can be coupled to the secondary-side controller 116 and can send a signal to the primary-side controller 114 to indicate the output voltage, such as described in more detail below. The opto-coupler or the pulse transformer can be used to obtain tight voltage and current regulations.

In the depicted embodiment, the secondary-side controller 116 (also referred to as the secondary-side IC 116) comprises an N-gate driver circuitry 136 (also referred to as an N-gate driver or a secondary gate driver herein) integrated onto the secondary-side controller. The N-gate driver 136 may be programmable, with a programmable gate-source clamp voltage of the provider FET 138 and a programmable slew rate. The N-gate driver 136 may be coupled to a gate of the provider FET 138 to control the provider FET 138. In one embodiment, the provider FET 138 may be a provider NFET. In another embodiment, the provider FET 138 may be a provider PFET.

In one embodiment, secondary-controlled flyback converter 100 includes a pulse transformer 130 coupled between the primary-side controller 114 and the secondary-side controller 116. The primary-side controller 114 is configured to receive the signal 126 from the secondary-side controller 116 as one or more pulses via the pulse transformer 130. The primary-side controller 114 can include a pulse receiver 132 to receive the pulse signal 128 from the secondary-side controller 116 across the galvanic isolation barrier 124. The pulse receiver 132 can change the primary-side turn-on pulse based on output of the flyback transformer 108 (e.g., a PWM pulse sent from secondary-controller 116 in response to an Error Amplifier (EA) output on secondary side). With higher EA voltages, wider pulse width modulation (PWM) pulse are sent from secondary controller 116 via pulse transformer 130 which results in wider turn-on pulses. The primary-side controller 114 can also include a gate driver 134 coupled to the pulse receiver 132 and a gate of the primary-side FET 110. As described herein, the turn-on and turn-off pulses can have fixed widths or variable widths. In one embodiment, the pulse receiver 132 can include a PWM circuit. Alternatively, the pulse receiver 132 can use other types of circuits to receive the pulses across the galvanic isolation barrier 124.

In one embodiment, the primary-side controller 114, in order to apply the pulse signal 128 to the primary-side FET 110, is configured to receive a turn-on pulse (PTDRV) from the secondary-side controller 116. The primary-side controller 114 applies the turn-on pulse to the gate of the primary-side FET 110 via the gate driver 134. The turn-on pulse causes the primary drain of the primary-side FET 110 to go "low," i.e., from a higher state to a lower state (e.g., a first voltage level corresponding to a first state or representing the digital value of one) and the secondary drain of the secondary-side FET 112 to go from a lower state to a higher state. Subsequently, the primary-side controller 114 receives a turn-off pulse from the secondary-side controller 116 and applies the turn-off pulse to the gate of the primary-side FET 110 via the gate driver 134. The turn-off pulse causes the primary drain of the primary-side FET 110 to go "high," i.e., from a lower state to a higher state (e.g., a second voltage level corresponding to a second state or representing the digital value of zero) and the secondary drain of the secondary-side FET 112 to go low.

In the depicted embodiment, the secondary-side controller 116 includes a secondary gate driver 136 with a programmable gate-source clamp voltage for provider FET 138 and a programmable slew rate. The secondary gate driver 136 (N-gate driver) is coupled to a gate of the provider FET 138. The secondary gate driver 136 can be implemented as one or more N-gate driver devices to drive a provider FET 138. In one embodiment, the provider FET 138 may be an NFET. The programmable secondary gate driver allows a gate-source clamp voltage of the provider FET 138 to be programmed, allowing for the use of a wide range of external FETs. The secondary gate driver further has a programmable slew rate control solution to support a wide range of external FET gate capacitances and to avoid in-rush currents. The features of the programmable secondary gate driver may reduce the bill of material by avoiding the usage of external resistors and Zener diodes. In one embodiment, the N-gate driver 136 (the secondary gate driver) includes a keep-off circuit 137, a charge-pump 139, a slew-rate controlled driver 141, and a clamp circuit 143. The charge-pump is coupled to an input node which is coupled to the flyback transformer 108. In one embodiment, the charge-pump includes a feedback circuit coupled to an output of the charge-pump circuit. The slew-rate controlled driver 141 is coupled between the output node of the charge-pump circuit and the gate of the provider FET. The clamp circuit 143 is coupled between the gate of the provider FET and the source of the provider FET.

As illustrated in FIG. 1, an N-gate driver (e.g., the secondary gate driver) integrated on the secondary-side controller 116 can control provider FET 138 (e.g., an NFET switch) in order to deliver power to a consumer device. The secondary gate driver may enable or disable the provider FET. In one embodiment, the programmable current source feature of the secondary gate driver can be fixed for a particular application. In another embodiment, the programmable current source feature of the secondary gate driver can be programmed using firmware or an external controller. Additional details of the programmable secondary gate driver 136 are described below with respect to FIG. 2.

Figure 2:
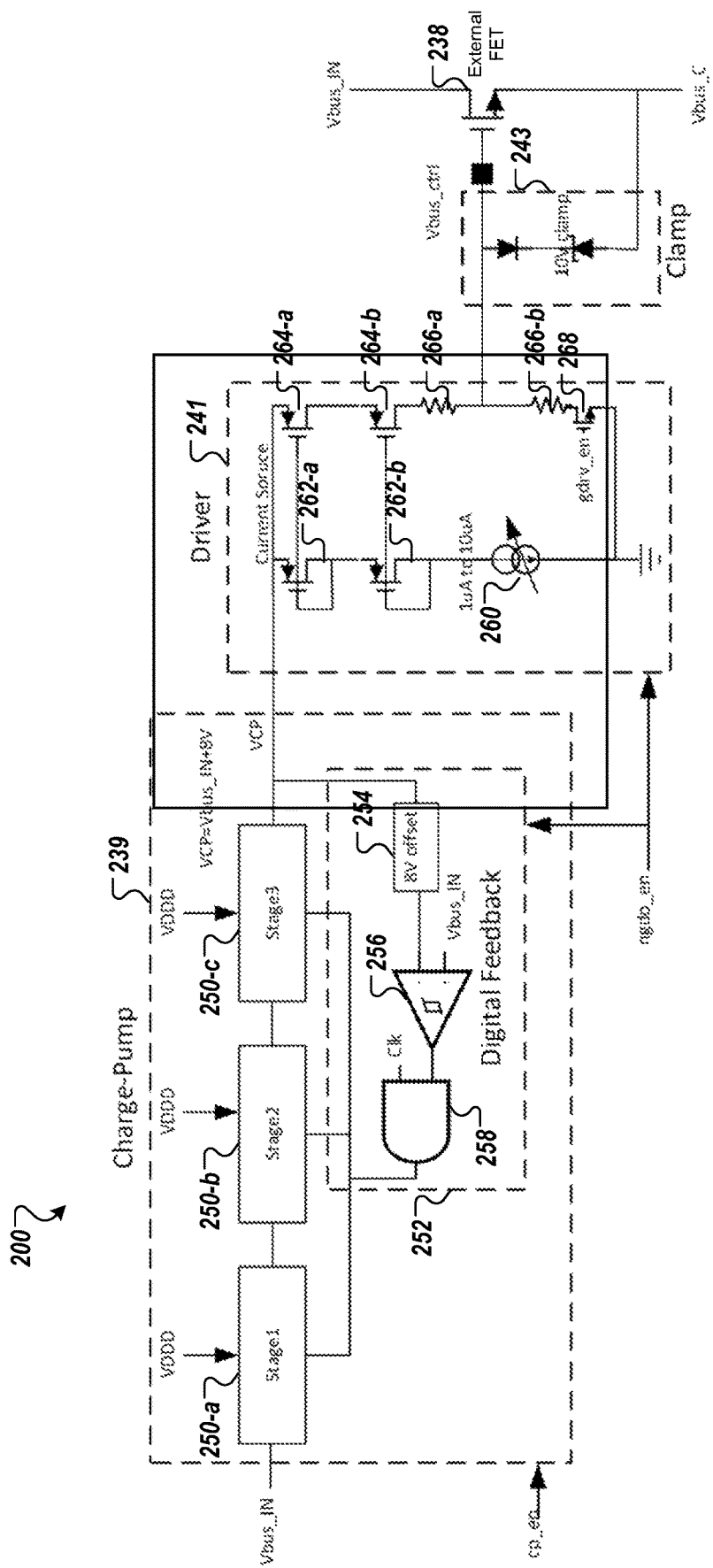
FIG. 2 is block diagram of a secondary gate driver integrated on a secondary-side controller in a secondary-controlled flyback converter according to one embodiment.

FIG. 2 is block diagram of a secondary gate driver 200 integrated on a secondary-side controller in a secondary-controlled flyback converter according to one embodiment. Although not all components of the secondary-controlled flyback converter are shown, the secondary-controlled flyback converter is similar to the secondary-controlled flyback converter 100 of FIG. 1 as noted by similar reference numbers. To control provider FET 238, the secondary gate driver 200 drives the provider FET 238. In one embodiment, the secondary gate driver 200 comprises a charge-pump control circuit 239, a programmable slew rate control circuit 241, and a voltage clamp control circuit 243. The charge-pump control circuit 239 is coupled to an input node (Vbus_IN), which is coupled to the flyback transformer. The programmable slew rate control circuit 241 is coupled to an output node of the charge-pump circuit and further coupled to a gate of the provider FET. The voltage clamp control circuit 243 is coupled between the gate of the provider FET 238 and the source of the provider FET 238.

In one embodiment, the charge-pump control circuit 239 is a three-stage charge-pump control circuit. A first stage 250-a of the three-stage charge-pump circuit is coupled to the input node of the charge-pump (e.g., the input node of the first stage may be the input node of the charge-pump). A second stage **250-*b* of the three-stage charge-pump circuit 239 is coupled to an output of the first stage 250-*a*. Further, a third stage 250-*c* is coupled to an output of the second stage 250-*b*. With the three-stage charge-pump, each stage can provide a supply voltage (VDDD) of 3.3V to 5.5V for a total of between 9V to 16.5V. The input supply (Vbus Ind.) can dynamically change from 3.3V to 21.5V. In order to limit the maximum charge-pump voltage to below the technology limit (e.g., 34V) a control feedback loop 252** may be used. In another embodiment the charge-pump may be a multi-stage charge-pump.

In one embodiment, the control feedback loop 252 can be a digital feedback loop and includes a voltage offset block 254 (e.g., to offset the voltage by 8V) coupled to the output of the three-stage charge-pump. The control feedback loop 252 further has a comparator 256. The first input of the comparator is coupled to the output of the voltage offset block 254. The second input of the comparator is coupled the input node (Vbus_IN) of the charge-pump 239. The output of the comparator 256 is coupled to a first input of a logic gate 258. The second input of the logic gate is coupled to receive a clock signal. In another embodiment, the control feedback loop can be an analog feedback loop (not illustrated in FIG. 2).

The three-stage charge-pump 239 with the control feedback loop 252 is to limit the maximum charge-pump voltage to 30V (e.g., below the technology limit) in order to improve the reliability of internal circuits.

The programmable slew rate control circuit 241 is to support different FET devices, e.g., with different gate capacitances and to prevent damage to FET devices due to in-rush current. The programmable slew rate control circuit 241 has a programmable current source 260 (e.g., 1 uA to 10 uA) and is to control the programmable slew rate. The programmable slew rate controller 241 further has a first pair of FETs **262-*a* and 262-*b* which are coupled in series with each other and with the programmable current source 260. The first pair of FETs 262-*a* and 262-*b* is further coupled between the output node of the charge-pump circuit and a ground potential. The programmable slew rate controller 241 further has a second pair of FETs 264-*a* and 264-*b*. The programmable slew rate controller has a pair of resistive elements 266-*a* and 266-*b* coupled in series between the output node of the charge-pump and the ground potential. A node between the pair of resistive elements is coupled to the gate of the provider FET 238. In one embodiment, a FET 268** is coupled between one of the resistive elements of the pair of resistive elements and the ground potential, wherein a gate of the FET is coupled to receive a driver-enable signal to enable to programmable slew rate control circuit.

In one embodiment, the secondary gate driver measures a first voltage signal at an input node coupled to a drain of the provider FET 238 and measures a second voltage signal at an output node coupled to a source of the provider FET 238. In this embodiment, the secondary gate driver 200 may control the gate-source clamp voltage of the provider FET 238, may control a slew rate of the provider FET 238, and may output a gate control signal to a gate of the provider FET 238. The slew rate corresponds to a gate capacitance of the provider FET 238. Further, the charge-pump 239 may multiply the first voltage signal to obtain an internal voltage. In one embodiment, the charge-pump may be a three-stage charge-pump. In another embodiment, the charge-pump may be a multi-stage charge-pump. The feedback circuit 252 of the secondary gate driver 200 may provide to each stage of the multi-stage charge-pump, a feedback signal corresponding to the internal voltage. In one embodiment, the feedback circuit may be a digital feedback circuit. In another embodiment, the feedback circuit may be an analog feedback circuit. The programmable slew rate control 241 may provide an output current to the gate of the provider FET 238, wherein the output current corresponds to the internal voltage.

In another embodiment, the secondary gate driver 200 receives a first voltage signal at an input node coupled to a drain of the provider FET 238 and receives a second voltage signal at an output node coupled to a source of the provider FET 238. In this embodiment, the secondary gate driver 200 may control the gate-source clamp voltage of the provider FET 238, may control a slew rate of the provider FET 238, and may output a gate control signal to a gate of the provider FET 238. The slew rate corresponds to a gate capacitance of the provider FET 238. Further, the charge-pump 239 may multiply the first voltage signal to obtain an internal voltage. In one embodiment, the charge-pump may be a three-stage charge-pump. In another embodiment, the charge-pump may be a multi-stage charge-pump. The feedback circuit 252 of the secondary gate driver 200 may provide to each stage of the multi-stage charge-pump, a feedback signal corresponding to the internal voltage. In one embodiment, the feedback circuit may be a digital feedback circuit. In another embodiment, the feedback circuit may be an analog feedback circuit. The programmable slew rate control 241 may provide an output current to the gate of the provider FET 238, wherein the output current corresponds to the internal voltage.

In one embodiment, the secondary gate driver 200 has a programmable gate-source voltage clamp 243. The secondary gate driver input Vbus_IN voltage can dynamically change from 3.3V to 21.5V and provides a discharge path to the provider FET 238 gate capacitor. The programmable gate-source voltage clamp 243 is to limit the gate-source voltage (e.g., to 10V) during a fault condition in which the output voltage (Vbus_c) shorts (e.g., goes to 0V) prior to when the provider FET 238 is turned off by a short circuit protection circuit. An advantage of the programmable gate-source voltage clamp 243 circuit is to make the system less prone to latch-up issues when the gate pin of the provider FET 238 is shorted to ground.

As illustrated in FIG. 2, the secondary gate driver is to enable or disable the provider FET and comprises a charge-pump circuit, a feedback control circuit, a programmable slew rate control circuit, and a gate-source voltage clamp circuit. Controlling the provider FET with a secondary gate driver integrated on the secondary-side controller allows the gate-source clamp voltage of the provider FET to be programmable, which allows for the use of a larger range of external FETs as the provider FET. The programmable slew rate control further allows for the support of a wide range of provider FETs by limiting internal nodes to 30V and by avoiding issues due to in-rush currents. The voltage clamp circuit limits the gate-source voltage of the provider FET during a fault condition, which means that the FET is protected from getting damaged, as described further in FIG. 3. Further, by integrating these programmable circuits onto the secondary-side controller, the cost and area of the bill of material is reduced, by avoiding usage of external resistors and Zener diodes.

Figure 3:
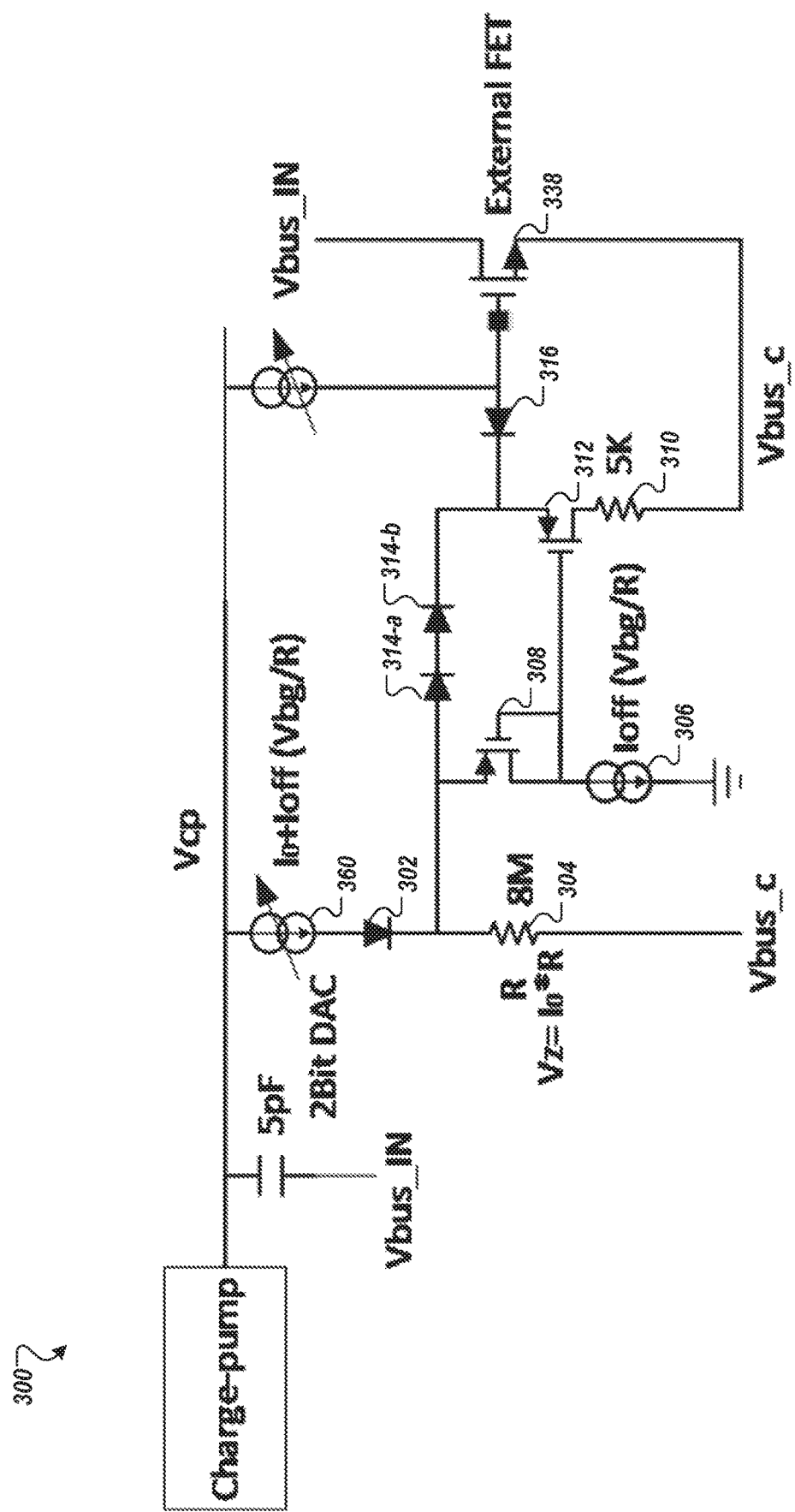
FIG. 3 is a schematic diagram of a gate-source voltage clamp circuit of a secondary gate driver according to one embodiment.

FIG. 3 is a schematic diagram of a gate-source voltage clamp circuit 300 of a secondary gate driver according to one embodiment. The gate-source voltage clamp circuit 300 includes a first diode 302 coupled to the programmable current source 360 of the programmable slew rate control circuit and a first node. The gate-source voltage clamp circuit also includes a first resistive element 304 coupled between the first node (between the first diode 302 and the first resistive element 304) and the source of the provider FET 338. The gate-source voltage clamp circuit 300 also includes a current source 306 coupled between a second node and a ground potential. The gate-source voltage clamp circuit 300 also includes a first FET 308 coupled between the first node and the second node, and wherein the gate of the first FET 308 is coupled to the second node; a second resistive element 310 coupled to the source node of the provider FET 338; a second FET 312 coupled in series between the second resistive element and a third node; a pair of diodes 314-*a* and 314-*b* coupled between the first node and the third node; and a second diode 316 coupled between the third node and the gate of the provider FET 338. In one embodiment, the source node of the provider FET 338 is coupled to a USB-C connector, and may provide power to a consumer when the provider FET 338 is switched on.

In one embodiment, the gate-source voltage clamp circuit 300 is to provide a current-source-based solution to isolate the output of the charge-pump circuit (e.g., VCP) to the gate of the provider FET (e.g., Vbus ctrl). In another embodiment, the gate-source voltage clamp circuit 300 is to provide a voltage-source based solution to isolate the output of the charge-pump circuit to the gate of the provider FET. The system may be less prone to latch up when the gate pin of the provider FET is shorted to ground. In one embodiment the gate-source voltage clamp circuit is a 10V clamp circuit to control the gate-source voltage of the provider FET (e.g., the external FET) to 10V with a wide supply voltage range (e.g., Vbus_IN).

Figure 4A:
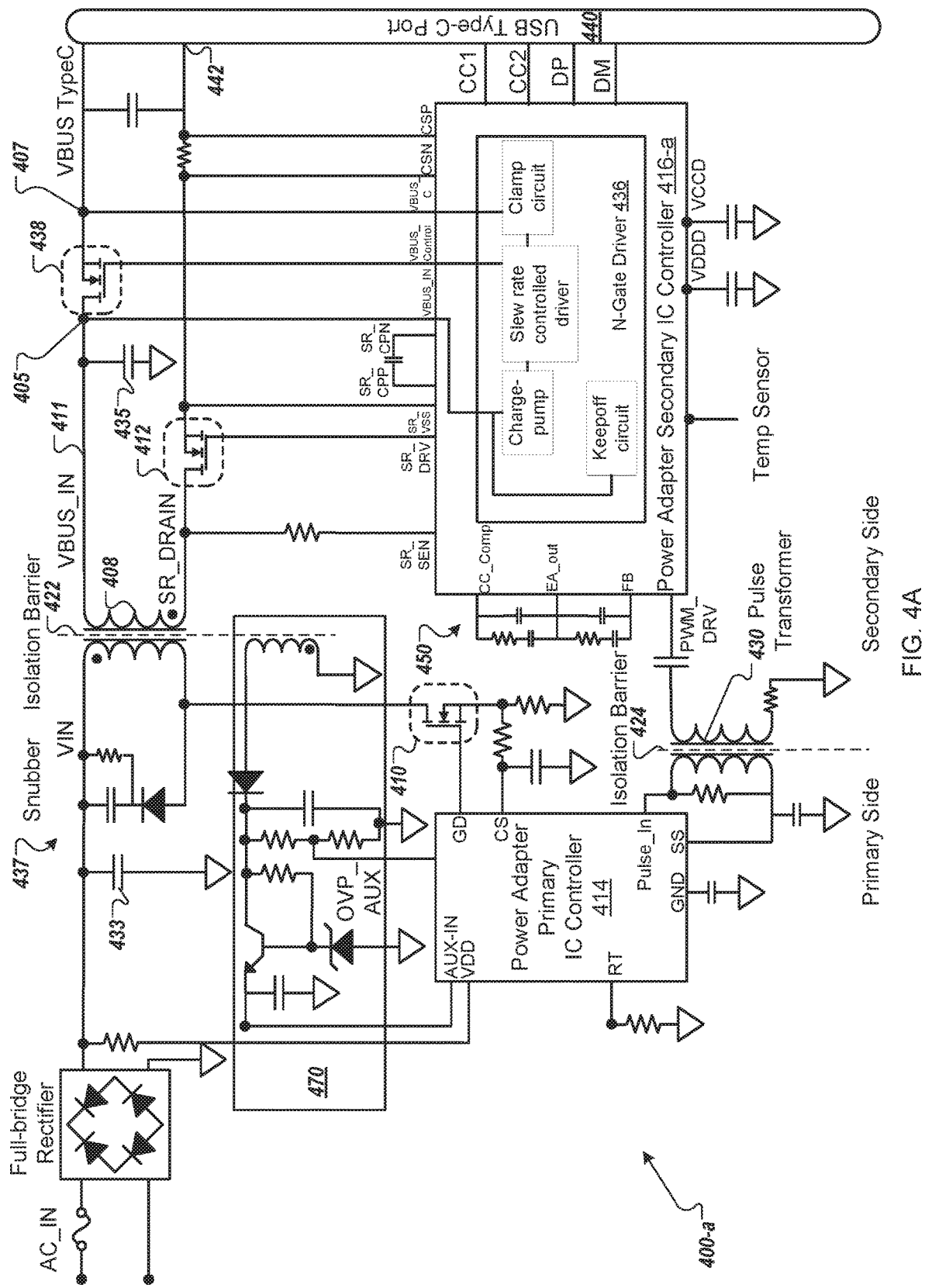
FIG. 4A is a schematic diagram of a USB-PD power adapter with a secondary gate driver (e.g., N-gate control driver or N-gate driver) with a programmable gate-source clamp voltage and a programmable slew rate, integrated on a secondary-side controller (also referred to as power adapter secondary IC controller) in one embodiment.

FIG. 4A is a schematic diagram of a USB-PD power adapter 400-*a* with a secondary gate driver 436-*a* (e.g., N-gate control driver or N-gate driver) with a programmable gate-source clamp voltage and a programmable slew rate, integrated on a secondary-side controller 416-*a* (also referred to as power adapter secondary IC controller) in one embodiment. Instead of opto-isolator feedback, the USB-PD power adapter 400-*a* can communicate information across the isolation barrier via a pulse transformer 430. The USB-PD power adapter 400-*a* includes a primary IC controller 414 and a secondary IC controller 416. The secondary IC controller 416-*a* may be disposed in a chip package and includes a USB-PD subsystem configured in accordance with the techniques for gate driver control described herein. The secondary IC controller 416-*a* is configured to negotiate a PD contract with a consumer device (not shown) attached to USB Type-C port 440 and to control through an output pin ("PWM_DRV") the required VBUS voltage that is output from flyback transformer 408. USB Type-C port 440 is typically associated with a Type-C plug, but it should be understood that in various embodiments the USB Type-C port may be associated with a Type-C receptacle instead. The secondary IC controller 416-*a* includes the secondary gate driver 436-*a*. The secondary gate driver 436-*a* can program a gate-source clamp voltage and a slew rate as descried above with respect to secondary gate driver 136 of FIG. 1. The flyback transformer 408 is coupled to a rectified DC power source and the output can be coupled to a secondary-side FET 412 (e.g., SR_FET 412). The VBUS_IN is regulated by an error amplifier which is connected to a compensation network 450. The compensation network 450 can be a resistor-capacitor (RC) circuit specific to the design of the USB-PD power adapter 400. The compensation network 450 can be coupled to receive a feedback signal from a first output pin ("FB") of the secondary IC controller 416-*a*. The compensation network 450 can also be coupled to a second output pin ("EA_out") and a third output pin ("CC_Comp"). The flyback transformer 408 can be coupled to a large bulk capacitor 433, and a snubber circuit 437. The USB-PD power adapter 400-*a* may also include the pulse transformer 430 (or other feedback control mechanisms) for communicating information across an isolation barrier 424.

The secondary gate driver 436-*a* integrated on the secondary IC controller 416-*a* is coupled to VBUS line 411 and is configured to control the operation and state of power switches (such as power switch 438-*a*, also referred to as provider FET 438-*a* herein) when fault conditions are detected by providing control signals to the gate of the power switches. The secondary gate driver 436-*a* limits the gate-source voltage of the provider FET 438-*a* during a fault condition when the source pin of the provider FET 438-*a* is shorted to ground (e.g., brought to 0V). VBUS line 411 includes power switch 438-*a* (provider FET 438-*a*) configured as an on/off switch device controlled by signals from an output pin ("VBUS_Control") of secondary gate driver 436-*a* in the secondary IC controller 416-*a*. Power switch 438-*a* may correspond to a provider FET described herein. The secondary gate driver 436-*a* provides programmable gate-source clamp voltage of the provider FET 438-*a*, which allows for the use of external FETs with a wider range of voltages. In one embodiment, provider FET 438-*a* may be an NFET, controlled by an N-gate driver integrated on the secondary-side controller. In another embodiment, provider FET 438-*a* may be a PFET, controlled by a P-gate driver integrated on the secondary-side controller. On one side of provider switch 438-*a*, a power source node 405 on the VBUS line 411 is coupled to second winding of the flyback transformer 408, which is coupled to a large bulk capacitor 435 configured to remove the AC component of the power signal. Power source node 405 is coupled to an input pin ("VBUS_IN") of the secondary IC controller 416. On the other side of provider switch 438, an output node 407 on the VBUS line 411 is coupled to USB Type-C port 440. Output node 407 is coupled to another input pin ("VBUS_C") of the secondary IC controller 416. The GND terminal 442 of USB Type-C port 440 is coupled to a secondary-side FET 412.

In operation, the direction of power flow on VBUS line 411 is from the flyback transformer 408 to a consumer device, such as a laptop computer (not shown), that is attached to USB Type-C port 440. When a PD contract with the consumer device is negotiated, the secondary IC controller 416-*a* turns on the provider switch 438-*a* to provide power to the consumer device at the negotiated voltage and/or current level(s). A high-to-low voltage transition on VBUS line 411 may be needed when the PD contract is dynamically re-negotiated to lower the VBUS voltage and/or current, e.g., when the consumer device has finished charging its battery and now needs power only to operate.

On detection of fault conditions, a control signal may be sent to limit the gate-source voltage of the power switch 438-*a* and to turn off the power switch 438-*a*, thereby disconnecting the USB Type-C port 440 from the flyback transformer 408. The provider switch 420 is turned off by driving the output of VBUS_Control to zero. By limiting the gate source voltage of the power switch 438-*a*, the FET is protected from getting damaged. This disconnection may be caused by an over-voltage condition, an over-current condition, or other conditions that may require disconnection of the USB Type-C port 440 from the flyback transformer 408 for protection of circuits coupled to the USB Type C port 440.

In a further embodiment, an auxiliary circuit 470 that can be coupled to the primary IC controller 414. An auxiliary output pin ("AUX_IN") and an overvoltage protection auxiliary pin ("OVP_AUX") are coupled to the auxiliary circuit 470. The auxiliary circuit 470 can operate to protect for overvoltage of the VBUS_IN 411 and also provide power (AUX_IN) to the Primary IC 414 once start-up is complete.

As noted above, the USB-PD power adapter 400-*a* permits control of a gate-source voltage of a provider FET 438-*a* by a secondary gate driver integrated on a secondary-side controller as described above with respect to FIGS. 1-3. In particular, a PWM driver circuit of the secondary IC controller 416-*a* can output a signal on an output pin ("PWM_DRV") to communicate information across the isolation barrier 424 via the pulse transformer 430. As noted herein, PWM driver circuit can be other driver circuits that create pulses on the output pin to communicate information across the isolation barrier 424. The primary IC controller 414 can include a detection circuit that receives a signal on an input pin ("Pulse_In") and detects when the secondary IC controller 416-*a* is communicating information. For example, the secondary IC controller 416-*a* can detect a fault condition and can communicate this information to the primary IC controller 414 via the pulse transformer 430 as well as limit the gate-source voltage during the fault condition to protect the FET from getting damaged. In another embodiment, the primary IC controller 414 can communicate information across the isolation barrier 422 via the flyback transformer 408. The primary IC controller 414 can include a circuit to vary pulses received from the secondary IC controller 416-*a* via the pulse transformer 430. By varying the pulses, the primary IC controller 414 can send information across the flyback transformer 408 via the primary power switch 410. The secondary IC controller 416-*a* can include a circuit that measures the drain (SR_D-RAIN) of the secondary power switch 412 and can detect when the primary IC controller 414 is communicating information.

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as primary-side switching FET or primary FET) is coupled to a primary winding of the flyback transformer and the primary-side controller. A secondary-side power switch is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The secondary-side controller is also configured to communicate information to the primary-side controller across the pulse transformer, as described herein.

In a further embodiment, the primary-side controller includes a pulse receiver and a gate driver. The pulse receiver receives the first signal from the secondary-side controller across the galvanic isolation barrier. The first signal includes a first turn-on pulse to turn on the primary-side power switch and a first turn-off pulse to turn off the primary-side power switch. In response, the driver, which is coupled to the pulse receiver and the primary-side power switch, applies the first turn-on pulse and the first turn-off pulse to the primary-side power switch.

In a further embodiment, the AC-DC power adapter device includes a pulse transformer coupled between the primary-side controller and the secondary-side controller. The primary-side controller is configured to receive the first signal from the secondary-side controller as one or more pulses via the pulse transformer. The primary-side controller can detect when the secondary-side controller is communicating information via the pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, OCP, SCP, PFC, SR, or the like. The information can include fault information for any of these different functions.

In embodiments, SBPD device is connected to power source, such as a wall socket power source that provides AC power. In other embodiments, power source may be a different power source, such as a battery, and may provide DC power to SBPD device. The Power converter may convert the power received from power source (e.g., convert power received to Vbus_in, which may range from 3.3V to 21.5V). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side). In another embodiment, the device may be a consumer device receiving power from the SBPD device, wherein the consumer device may control the gate-source voltage of its provider FET with a secondary gate driver integrated onto the secondary-side controller of the consumer device.

In some embodiments, SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C controller compatible with the USB Type-C standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C and USB-Power Delivery port control solution for notebooks, dongles, monitors, docking stations, power adapters, vehicle chargers, power banks, mobile adaptors, and the like.

Figure 4B:
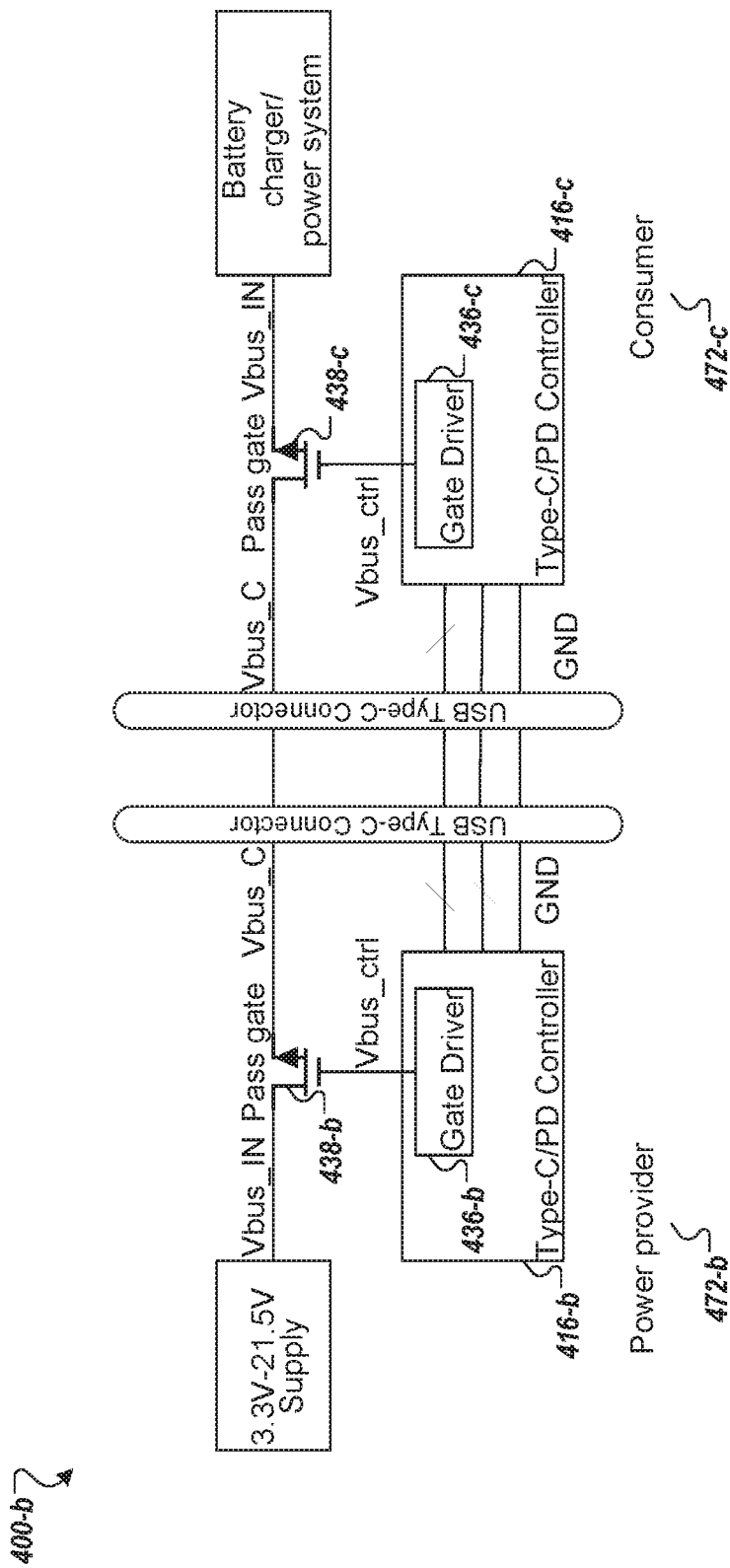
FIG. 4B is a schematic diagram of a USB-PD power adapter with a secondary gate driver (e.g., N-gate control driver or N-gate driver) integrated on a secondary-side controller (also referred to as power adapter secondary IC controller) to deliver power from a power provider device to an attached consumer device according to one embodiment.

FIG. 4B is a schematic diagram of a USB-PD power adapter 400-b with a secondary gate driver 436-b (e.g., N-gate control driver or N-gate driver) integrated on a secondary-side controller 416-b (also referred to as power adapter secondary IC controller) to deliver power from a power provider device 472-b to an attached consumer device 472-c according to one embodiment. When a consumer device 472-c is connected to a power provider 472-b, the provider secondary gate driver 436-b may enable or disable a provider FET 438-b (e.g., a provider NFET, a provider switch) in order to deliver power to the attached consumer device 472-c. For example, the provider secondary gate driver 436-b may enable the provider FET 438-b when power is to be delivered to the attached consumer device 472-c. Alternatively or in addition, the provider secondary gate driver 436-b may disable the provider FET 438-b when power is not to be delivered to the attached consumer device 472-c.

The consumer device 472-c may be a USB-PD power consumer with a secondary gate driver 436-c (e.g., N-gate control driver or N-gate driver) integrated on a secondary-side controller 416-c of the consumer device, to receive power from an attached power provider device 472-b (e.g., to charge a battery of the consumer device 472-c) in one embodiment. When the power provider device 472-b is connected to the consumer device 472-c (e.g., serving as a power supply), the consumer secondary gate driver 436-c may enable or disable a consumer FET 438-c (e.g., a consumer NFET, a consumer switch) in order to receive power from the attached provider device 472-b. For example, the consumer secondary gate driver 436-c may enable the consumer FET 438-c when power is to be received from the attached provider device 472-b to charge a battery, in one embodiment. Alternative or in addition, the consumer secondary gate driver 436-c may disable the consumer FET 438-c when power is not to be received from the power provider device 472-b.

In another embodiment, the consumer device 472-c may be a USB-PD power consumer to receive power from an attached power provider device 472-b (e.g., to charge a battery of the consumer device 472-c). When the power provider device 472-b is connected to the consumer device 472-c (e.g., serving as a power supply), the provider secondary gate driver 436-b may enable or disable a provider FET 438-b (e.g., a provider NFET, a provider switch) and a consumer FET 438-c (e.g., a consumer NFET, a consumer switch) such that the power provider 472-b is to provider power to the consumer device 472-c and the consumer device 472-c is to receive power from the attached provider device 472-b. For example, the provider secondary gate driver 436-b may enable the provider FET 438-b and the consumer FET 438-c when power is to be received from the attached provider device 472-b to charge a battery, in one embodiment. Alternatively, or in addition, the provider secondary gate driver 436-b may disable the provider FET 438-b and the consumer FET 438-c when power is not to be received from the power provider device 472-b.

As described in reference to FIGS. 1-4A, the consumer secondary gate driver 436-a may be an N-gate control driver or an N-gate driver. The consumer secondary gate driver 436-a is a programmable N-gate control driver with a programmable gate-source clamp voltage and a programmable slew rate, integrated on a secondary-side controller of the consumer device. Although not all components of the consumer secondary gate driver are shown, the consumer secondary gate driver 436-c is similar to the provider secondary gate driver 436-b as noted by similar reference numbers. In one embodiment, the consumer secondary gate driver 436-c comprises a charge-pump control circuit. The charge-pump control circuit comprises a control feedback loop circuit. The charge-pump control circuit is coupled to an input node of the consumer device 472-c (Vbus_C), which is coupled to a connector. In one embodiment, the charge-pump control circuit of the consumer device 472-c may be a three-stage charge pump control circuit. In another embodiment, the charge-pump control circuit of the consumer device 472-c may be a multi-stage charge-pump control circuit.

In one embodiment, the consumer secondary gate driver 436-c comprises a programmable slew rate control circuit. The programmable slew rate control circuit of the consumer device 472-c is to support different FET devices as the consumer FET 438-c, e.g., with different gate capacitances and to prevent damage to FET devices due to in-rush current. The programmable slew rate control circuit may provide an output current to the gate of the consumer FET 438-c, wherein the output current corresponds to an internal voltage of the consumer device 472-c.

In one embodiment, the consumer secondary gate driver 436-c comprises a programmable gate-source voltage clamp. The gate-source voltage clamp is to provide a discharge path to the consumer FET gate capacitor. The programmable gate-source voltage clamp may limit the gate-source voltage during a fault condition in which the input voltage (Vbus_c) shorts (e.g., goes to 0V) prior to when the consumer FET 438-c is turned off by a short circuit protection circuit. An advantage of the programmable gate-source clamp circuit is to make the system less prone to latch-up issues when the gate pin of the consumer FET 438-c is shorted to ground.

In the depicted embodiment, the power provider 472-b provides power (e.g., with a 3.3V-21.5V supply) to the consumer device 472-c (e.g., to charge a batter or power the system). In another embodiment, the consumer device 472-c may be a power provider and the power provider 472-b may be a consumer device. In another embodiment, the consumer device 472-c may be a consumer device that receives power from power provider 472-b and may also be a power provider to a different consumer device (not illustrated in FIG. 4B).

Figure 5:
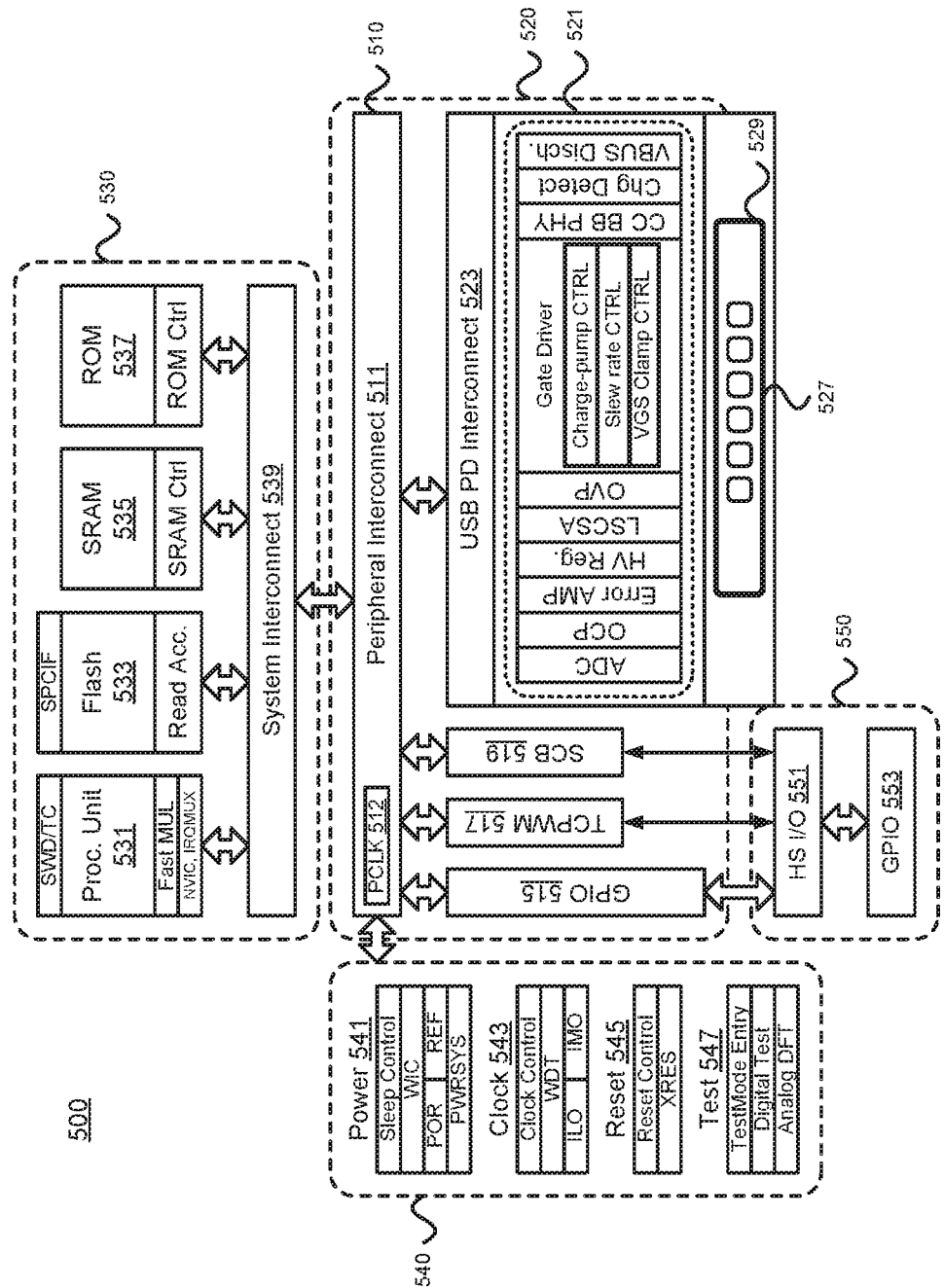
FIG. 5 is a block diagram illustrating a system for a USB device for use in USB power delivery in accordance with some embodiments.

FIG. 5 is a block diagram illustrating a system 500 for a USB device for use in USB power delivery in accordance with some embodiments. System 500 may include a peripheral subsystem 510 including a number of components for use in USB-PD. Peripheral subsystem 510 may include a peripheral interconnect 511 including a clocking module, peripheral clock (PCLK) 512 for providing clock signals to the various components of peripheral subsystem 510. Peripheral interconnect 511 may be a peripheral bus, such as a single-level or multi-level advanced high-performance bus (AHB), and may provide a data and control interface between peripheral subsystem 510, CPU subsystem 530, and system resources 540. Peripheral interconnect 511 may include controller circuits, such as direct memory access (DMA) controllers, which may be programmed to transfer data between peripheral blocks without input by, control of, or burden on CPU subsystem 530.

The peripheral interconnect 511 may be used to couple components of peripheral subsystem 510 to other components of system 500. Coupled to peripheral interconnect 511 may be a number of general purpose input/outputs (GPIOs) 515 for sending and receiving signals. GPIOs 515 may include circuits configured to implement various functions such as pull-up, pull-down, input threshold select, input and output buffer enabling/disable, single multiplexing, etc. Still other functions may be implemented by GPIOs 515. One or more timer/counter/pulse-width modulator (TCPWM) 517 may also be coupled to the peripheral interconnect and include circuitry for implementing timing circuits (timers), counters, pulse-width modulators (PWMs) decoders, and other digital functions that may operate on I/O signals and provide digital signals to system components of system 500. Peripheral subsystem 510 may also include one or more serial communication blocks (SCBs) 519 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 510 may include a USB power delivery subsystem 520 coupled to the peripheral interconnect and comprising a set of USB-PD modules 521 for use in USB power delivery. USB-PD modules 521 may be coupled to the peripheral interconnect 511 through a USB-PD interconnect 523. USB-PD modules 521 may include an analog-to-digital conversion (ADC) module for converting various analog signals to digital signals; an error amplifier (AMP) for regulating the output voltage on VBUS line per a PD contract; a high-voltage (HV) regulator for converting the power source voltage to a precise voltage (such as 3.5-5V) to power system 500; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 521 may also include a charger detection module for determining that a charging circuit is present and coupled to system 500 and a VBUS discharge module for controlling discharge of voltage on VBUS. In particular, the one or more gate drivers for external power FETs comprises a secondary gate driver integrated on the secondary-side controller to control a gate-source clamp voltage of the external power FET (e.g., provider FET) and control a slew rate of the external power FET, wherein the slew rate corresponds to a gate capacitance of the external power FET. As described with reference to FIGS. 1-3, the secondary-gate driver comprises a charge-pump control circuit, a programmable slew rate control circuit, and a voltage clamp control circuit. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 520 may also include pads 527 for external connections and electrostatic discharge (ESD) protection circuitry 529, which may be required on a Type-C port. USB-PD modules 521 may also include a communication module for retrieving and communicating information stored in non-volatile memory one controller with another controller, such as between a primary-side controller and a secondary-side controller of a flyback converter.

GPIO 515, TCPWM 517, and SCB 519 may be coupled to an input/output (I/O) subsystem 550, which may include a high-speed (HS) I/O matrix 551 coupled to a number of GPIOs 553. GPIOs 515, TCPWM 517, and SCB 519 may be coupled to GPIOs 553 through HS I/O matrix 551.

System 500 may also include a central processing unit (CPU) subsystem 530 for processing commands, storing program information, and data. CPU subsystem 530 may include one or more processing units 531 for executing instructions and reading from and writing to memory locations from a number of memories. Processing unit 531 may be a processor suitable for operation in an integrated circuit (IC) or a system-on-chip (SOC) device. In some embodiments, processing unit 531 may be optimized for low-power operation with extensive clock gating. In this embodiment, various internal control circuits may be implemented for processing unit operation in various power states. For example, processing unit 531 may include a wake-up interrupt controller (WIC) configured to wake the processing unit up from a sleep state, allowing power to be switched off when the IC or SOC is in a sleep state. CPU subsystem 530 may include one or more memories, including a flash memory 533, and static random access memory (SRAM) 535, and a read-only memory (ROM) 537. Flash memory 533 may be a non-volatile memory (NAND flash, NOR flash, etc.) configured for storing data, programs, and/or other firmware instructions. Flash memory 533 may include a read accelerator and may improve access times by integration within CPU subsystem 530. SRAM 535 may be a volatile memory configured for storing data and firmware instructions accessible by processing unit 531. ROM 537 may be configured to store boot-up routines, configuration parameters, and other firmware parameters and settings that do not change during operation of system 500. SRAM 535 and ROM 537 may have associated control circuits. Processing unit 531 and the memories may be coupled to a system interconnect 539 to route signals to and from the various components of CPU subsystem 530 to other blocks or modules of system 500. System interconnect 539 may be implemented as a system bus such as a single-level or multi-level AHB. System interconnect 539 may be configured as an interface to couple the various components of CPU subsystem 530 to each other. System interconnect 539 may be coupled to peripheral interconnect 511 to provide signal paths between the components of CPU subsystem 530 and peripheral subsystem 510.

System 500 may also include a number of system resources 540, including a power module 541, a clock module 543, a reset module 545, and a test module 547. Power module 541 may include a sleep control module, a wake-up interrupt control (WIC) module, a power-on-reset (POR) module, a number of voltage references (REF), and a PWRSYS module. In some embodiments, power module 541 may include circuits that allow system 500 to draw and/or provide power from/to external sources at different voltage and/or current levels and to support controller operation in different power states, such as active, low-power, or sleep. In various embodiments, more power states may be implemented as system 500 throttles back operation to achieve a desired power consumption or output. Clock module 543 may include a clock control module, a watchdog timer (WDT), an internal low-speed oscillator (ILO), and an internal main oscillator (IMO). Reset module 545 may include a reset control module and an external reset (XRES) module. Test module 547 may include a module to control and enter a test mode as well as testing control modules for analog and digital functions (digital test and analog DFT).

System 500 may be implemented in a monolithic (e.g., single) semiconductor die. In other embodiments, various portions or modules of system 500 may in implemented on different semiconductor dies. For example, memory modules of CPU subsystem 530 may be on-chip or separate. In still other embodiments, separate-die circuits may be packaged into a single "chip," or remain separate and disposed on a circuit board (or in a USB cable connector) as separate elements.

System 500 may be implemented in a number of application contexts to provide USB-PD functionality thereto. In each application context, an IC controller or SOC implementing system 500 may be disposed and configured in an electronic device (e.g., a USB-enabled device) to perform operations in accordance with the techniques described herein. In one example embodiment, a system 500 may be disposed and configured in a personal computer (PC) power adapter for a laptop, a notebook computer, etc. In another example embodiment, system 500 may be disposed and configured in a power adapter (e.g., a wall charger) for a mobile electronic device (e.g., a smartphone, a tablet, etc.). In another example embodiment, system 500 may be disposed and configured in a wall socket that is configured to provide power over USB Type-A and/or Type-C port(s). In another example embodiment, system 500 may be disposed and configured in a car charger that is configured to provide power over USB Type-A and/or Type-C port(s). In yet another example embodiment, system 500 may be disposed and configured in a power bank that can get charged and then provide power to another electronic device over a USB Type-A or Type-C port. In other embodiments, a system like system 500 may be configured with the power switch gate control circuitry described herein and may be disposed in various other USB-enabled electronic or electro-mechanical devices.

It should be understood that a system, like system 500 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 500 should be regarded in an illustrative rather than a restrictive sense.

Figure 6:
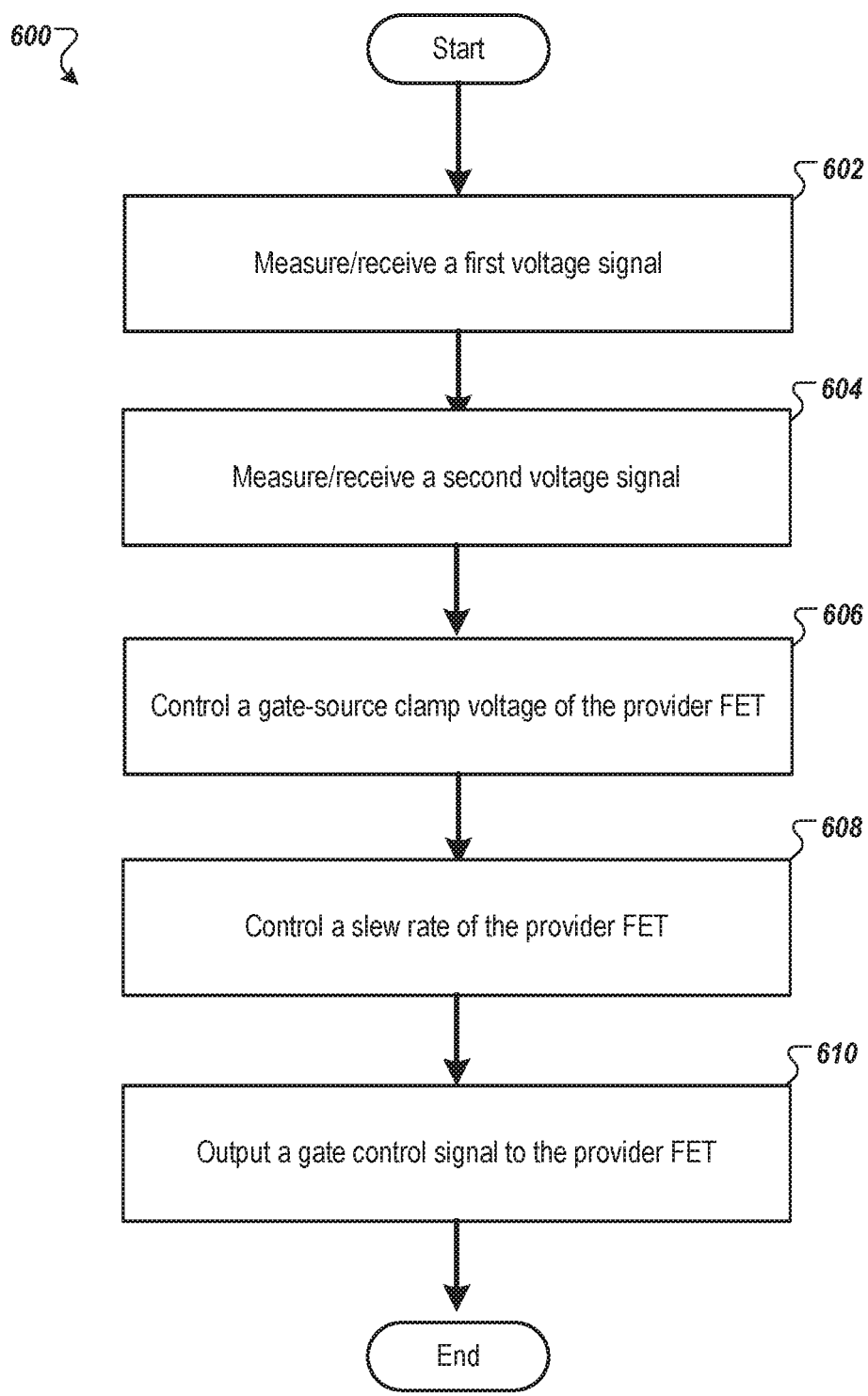
FIG. 6 is a flow diagram of a method of controlling a gate-source clamp voltage of a provider FET and controlling a slew rate of the provider FET in accordance with some embodiments.

FIG. 6 is a flow diagram of a method 600 of controlling a gate-source clamp voltage of a provider FET and controlling a slew rate of the provider FET according to one embodiment. The method 600 may be performed by processing logic that comprises hardware (e.g., circuitry, dedicated logic, programmable logic, microcode, etc.), software, firmware, or a combination thereof. In one embodiment, a secondary gate driver integrated on the secondary-side controller in a secondary-controlled AC-DC flyback converter performs the method 600. In another embodiment, the secondary gate driver 136 integrated on the secondary-side controller 116 of FIG. 1 performs the method 600. In another embodiment, the NFET gate driver 200 of FIG. 2 performs the method 600. In another embodiment, secondary gate driver 436-*a* integrated on the secondary IC controller 416-*a* of FIG. 4A performs the method 600. In another embodiment, the peripheral subsystem 510 of FIG. 5 performs the method 600.

Referring to FIG. 6, the method 600 begins by the processing logic measuring or receiving a first voltage signal from a flyback transformer of the power converter, at an input node coupled to a drain of a provider FET (block 602). The power converter can be a secondary-controlled AC-DC flyback converter with a galvanic isolation barrier. The processing logic measures or receives a second voltage signal at an output node coupled to a source of the provider FET (block 604). The processing logic controls a gate-source clamp voltage of the provider FET (block 606). The processing logic controls a slew rate of the provider FET (block 608). The slew rate corresponds to a gate capacitance of the provider FET. The processing logic outputs a gate control signal to a gate of the provider FET (block 610). Once the processing logic outputs the gate control signal, the method 600 ends.

In a further embodiment, the gate control signal output by the processing logic is to enable or disable the provider FET. In another embodiment, the gate control signal is to control the gate-source voltage of the provider FET. Controlling the gate-source voltage of the provider FET may involve a multi-stage charge-pump with a control feedback loop with a voltage offset (e.g., 8V) in order to limit the maximum voltage (for example, to 30V) and improve the reliability of internal circuits. In one embodiment, the multi-stage charge-pump may be a three-stage charge-pump. In one embodiment the control feedback loop may be a digital control feedback loop. In another embodiment, the control feedback loop may be an analog control feedback loop.

In another embodiment, the gate control signal is to control the slew rate of the provider FET. Controlling the slew rate of the provider FET allows the power converter to support different FET devices (e.g., those with different gate capacitances). In one embodiment, the provider FET is a provider NFET. In another embodiment, the provider FET is a provider PFET.

In some embodiments, the method 600 may be used by a power provider device. In other embodiments, the method 600 may be used by a power consumer device.

Figure 7:
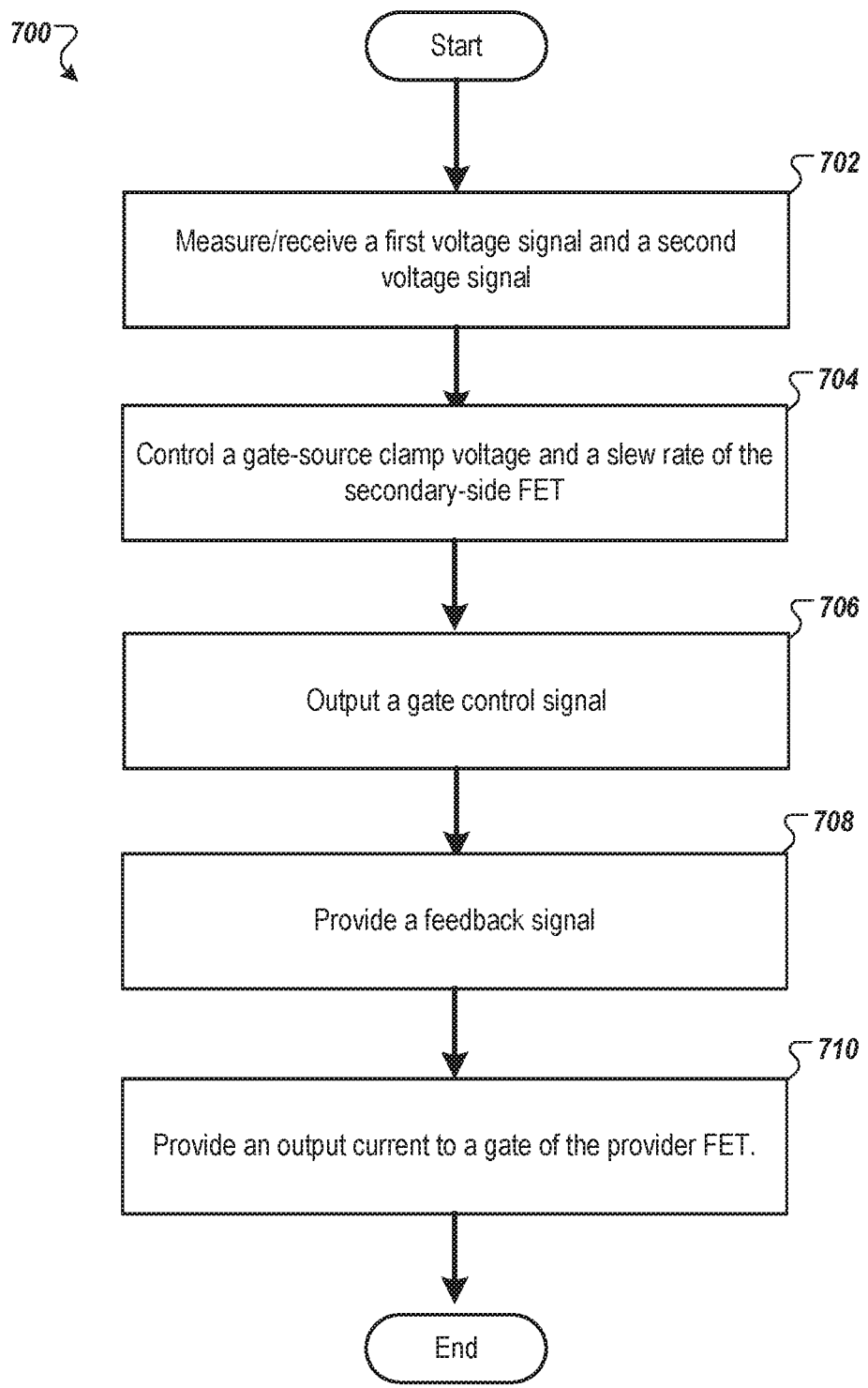
FIG. 7 is a flow diagram of a method of controlling a gate-source clamp voltage of a provider FET and controlling a slew rate of the provider FET according to one embodiment.

FIG. 7 is a flow diagram of a method 700 of controlling a gate-source clamp voltage of a provider FET and controlling a slew rate of the provider FET according to one embodiment. The method 700 may be performed by processing logic that comprises hardware (e.g., circuitry, dedicated logic, programmable logic, microcode, etc.), software, firmware, or a combination thereof. In one embodiment, a secondary gate driver integrated on the secondary-side controller in a secondary-controlled AC-DC flyback converter performs the method 700. In another embodiment, the secondary gate driver 136 integrated on the secondary-side controller 116 of FIG. 1 performs the method 700. In another embodiment, the NFET gate driver 200 of FIG. 2 performs the method 700. In another embodiment, secondary gate driver 436-*a* integrated on the secondary IC controller 416-*a* of FIG. 4A performs the method 700. In another embodiment, the peripheral subsystem 510 of FIG. 5 performs the method 700.

Referring to FIG. 7, the method 700 begins by the processing logic measuring a first voltage signal and a second voltage signal. Additionally or alternatively, the processing logic may receive the first voltage signal and the second voltage signal (block 702). The first voltage signal is measured/received at an input node coupled to a drain of a provider FET. The second voltage signal is measured/received at an output node coupled to a source of the provider FET. In some embodiments, the provider FET is a provider NFET. In other embodiments, the provider FET is a provider PFET. The processing logic may then control a gate-source clamp voltage and a slew rate of the provider FET (block 704). Programming the gate-source clamp voltage and the slew rate of the provider FET allows to use external FETs with a wide range of voltages and capacitances as the provider FET. The processing logic outputs a gate control signal (block 706). The gate control signal is sent to a gate of the provider FET to control the provider FET. The processing logic may also provide a feedback signal to each stage of a multi-stage charge-pump (block 708). The feedback signal may be provided by a feedback circuit and corresponds to an internal voltage. In one embodiment, the feedback circuit is part of the charge-pump circuit (e.g., a three-stage charge-pump circuit, a multi-stage charge-pump circuit). In one embodiment, the multi-stage charge pump of the secondary gate driver may multiply the first voltage signal to obtain the internal voltage. The processing logic then provides an output current to the gate of the provider FET (block 710). The output current corresponds to the internal voltage. Since current is output, it has a corresponding slew rate. The slew rate corresponds to the gate capacitance of the provider FET. In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An integrated circuit (IC) controller comprising:
an input pin to sense an input voltage at a provider field effect transistor (FET) on a secondary side of an alternating current-direct current (AC-DC) converter;
an output pin to control a gate of the provider FET; and
a gate driver coupled to provide a gate control signal on the output pin, wherein the gate driver comprises:
a charge-pump circuit coupled to the input pin; and
a programmable slew rate control circuit coupled to the output pin, wherein the programmable slew rate control circuit is coupled to an output node of the charge-pump circuit;
wherein the gate driver is configured to generate the gate control signal to control the provider FET with a programmable gate-source clamp voltage and a programmable slew rate.

2. The IC controller of claim 1, wherein the programmable slew rate control circuit comprises a programmable current source to control the programmable slew rate.

3. The IC controller of claim 2, wherein the programmable slew rate control circuit further comprises:
a first pair of FETs coupled in series with the programmable current source in between the output node of the charge-pump circuit and a ground potential;
a second pair of FETs; and
a pair of resistive elements, wherein the second pair of FETs and the pair of resistive elements are coupled in series between the output node of the charge-pump circuit and the ground potential, and wherein a node between the pair of resistive elements is coupled to the output pin.

4. The IC controller of claim 1, further comprising:
a source output pin to control a source of the provider FET; and
a voltage clamp circuit coupled between the output pin and the source output pin, wherein the voltage clamp circuit is to limit a gate-source voltage of the provider FET during a fault condition.

5. The IC controller of claim 4, wherein the voltage clamp circuit comprises:
a first diode coupled to a programmable current source of the programmable slew rate control circuit and a first node;
a first resistive element coupled between the first node and the source output pin;
a current source coupled between a second node and a ground potential;
a first FET coupled between the first node and the second node, wherein a gate of the first FET is coupled to the second node;
a second resistive element coupled to the source output pin;
a second FET coupled in series between the second resistive element and a third node;
a pair of diodes coupled between the first node and the third node; and
a second diode coupled between the third node and the output pin.

6. The IC controller of claim 1, further comprising a feedback circuit coupled to the output node of the charge-pump circuit, the feedback circuit to control a gate-source voltage of the provider FET.

7. The IC controller of claim 6, wherein the feedback circuit is configured to limit the gate-source voltage of the provider FET to 30 volts or less.

8. The IC controller of claim 6, wherein:
the charge-pump circuit comprises a first stage coupled to the input pin, a second stage coupled to a first output node of the first stage, and a third stage coupled to a second output node of the second stage; and
the feedback circuit is coupled between the output node of the charge-pump circuit and each of the first stage, the second stage, and the third stage.

9. The IC controller of claim 6, wherein the feedback circuit comprises:
a voltage offset block coupled to the output node of the charge-pump circuit;
a comparator with a first input coupled to an output of the voltage offset block and a second input coupled to the input pin; and
a logic gate with a first input coupled to an output of the comparator and a second input coupled to receive a clock signal.

10. The IC controller of claim 6, wherein the feedback circuit is one of a digital feedback circuit and an analog feedback circuit.

11. A method of operating a secondary side integrated circuit (IC) controller for an alternating current-direct current (AC-DC) converter, the method comprising:
receiving, by a gate driver of the IC controller, a first voltage signal from a drain of a provider field effect transistor (FET) on a secondary side of the AC-DC converter;
receiving, by the gate driver, a second voltage signal from a source of the provider FET;
generating, by the gate driver, a gate control signal based on the first voltage signal and the second voltage signal, wherein the gate control signal is configured to control the provider FET with a programmable gate-source clamp voltage and a programmable slew rate; and
outputting, by the gate driver, the gate control signal to a gate of the provider FET.

12. The method of claim 11, further comprising controlling the programmable slew rate of the provider FET by a programmable slew rate control circuit of the gate driver of the IC controller.

13. The method of claim 12, wherein the programmable slew rate of the provider FET corresponds to a gate capacitance of the provider FET.

14. The method of claim 11, further comprising controlling a gate-source voltage of the provider FET by a voltage clamp circuit of the gate driver of the IC controller.

15. The method of claim 14, wherein controlling the gate-source voltage of the provider FET comprises limiting the gate-source voltage upon detection of a fault condition.

16. The method of claim 15, wherein the fault condition is one of an over-voltage condition and an over-current condition.

17. The method of claim 11, further comprising controlling a gate-source voltage of the provider FET by a charge-pump circuit of the gate driver of the IC controller.

18. The method of claim 17, wherein controlling the gate-source voltage of the provider FET comprises limiting the gate-source voltage to a predetermined maximum voltage by using a feedback circuit coupled to the charge-pump circuit.

19. The method of claim 18, wherein the predetermined maximum voltage is 30 volts.

20. The method of claim 11, further comprising controlling, by the IC controller, a primary FET across a galvanic isolation barrier on a primary side of the AC-DC converter.

* * * * *